US008285620B1

(12) United States Patent
Heaney

(10) Patent No.: US 8,285,620 B1
(45) Date of Patent: Oct. 9, 2012

(54) METHODS AND SYSTEMS FOR BUILDING AND MANAGING PORTFOLIOS BASED ON ORDINAL RANKS OF SECURITIES

(75) Inventor: Ronan G. Heaney, Louisville, CO (US)

(73) Assignee: Westpeak Global Advisors, LLC, Boulder, CO (US)

( * ) Notice: Subject to any disclaimer, the term of this patent is extended or adjusted under 35 U.S.C. 154(b) by 352 days.

(21) Appl. No.: 12/556,231

(22) Filed: Sep. 9, 2009

Related U.S. Application Data

(60) Provisional application No. 61/095,851, filed on Sep. 10, 2008.

(51) Int. Cl.
*G06Q 40/00* (2012.01)
*G06Q 10/00* (2012.01)
*G06F 17/18* (2006.01)

(52) U.S. Cl. ............. 705/36 R; 705/5; 705/9; 705/11; 705/35; 705/36; 705/37; 705/38; 707/102; 702/179

(58) Field of Classification Search ............. 705/9, 11, 705/35, 36 R, 36 T, 37, 5, 36, 38; 707/5, 707/102; 702/179
See application file for complete search history.

(56) References Cited

U.S. PATENT DOCUMENTS

| 6,247,000 | B1 * | 6/2001 | Hawkins et al. | 705/37 |
|---|---|---|---|---|
| 6,313,833 | B1 * | 11/2001 | Knight | 705/36 R |
| 6,484,152 | B1 * | 11/2002 | Robinson | 705/36 R |
| 7,124,106 | B1 * | 10/2006 | Stallaert et al. | 705/37 |
| 7,177,831 | B1 * | 2/2007 | O'Shaughnessy et al. | 705/36 R |
| 7,668,773 | B1 * | 2/2010 | Pruitt | 705/36 T |
| 7,921,050 | B1 * | 4/2011 | Chadwick | 705/36 R |
| 2001/0042037 | A1 * | 11/2001 | Kam et al. | 705/36 |
| 2002/0194099 | A1 * | 12/2002 | Weiss | 705/36 |
| 2004/0030638 | A1 * | 2/2004 | Dwin | 705/38 |
| 2004/0181477 | A1 * | 9/2004 | Sauter et al. | 705/36 |
| 2004/0210596 | A1 * | 10/2004 | Budd et al. | 707/102 |
| 2005/0004833 | A1 * | 1/2005 | McRae et al. | 705/11 |
| 2005/0027583 | A1 * | 2/2005 | Smit et al. | 705/9 |
| 2005/0033679 | A1 * | 2/2005 | Rachev et al. | 705/36 |
| 2005/0075962 | A1 * | 4/2005 | Dunne | 705/36 |
| 2005/0171884 | A1 * | 8/2005 | Arnott | 705/36 |
| 2005/0210025 | A1 * | 9/2005 | Dalton et al. | 707/5 |
| 2005/0251465 | A1 * | 11/2005 | Brown et al. | 705/35 |
| 2005/0267835 | A1 * | 12/2005 | Condron et al. | 705/37 |
| 2006/0149649 | A1 * | 7/2006 | Hernandez | 705/35 |
| 2006/0190371 | A1 * | 8/2006 | Almgren et al. | 705/35 |
| 2006/0235646 | A1 * | 10/2006 | Fathallah-Shaykh | 702/179 |
| 2007/0130043 | A1 * | 6/2007 | O'Shaughnessy et al. | 705/36 R |
| 2007/0208645 | A1 * | 9/2007 | Hoffman et al. | 705/36 R |
| 2008/0091583 | A1 * | 4/2008 | Gorton et al. | 705/36 R |
| 2008/0270319 | A1 * | 10/2008 | Torabi et al. | 705/36 R |
| 2008/0288416 | A1 * | 11/2008 | Arnott et al. | 705/36 R |
| 2009/0164388 | A1 * | 6/2009 | Jones | 705/36 R |
| 2009/0182683 | A1 * | 7/2009 | Taylor et al. | 705/36 R |

(Continued)

FOREIGN PATENT DOCUMENTS

WO WO 2009070811 A1 * 6/2009

*Primary Examiner* — Ella Colbert
*Assistant Examiner* — Barbara Joan Amelunxen
(74) *Attorney, Agent, or Firm* — Ropes & Gray LLP

(57) ABSTRACT

A system, method, and computer-readable medium are provided for managing a portfolio using financial instrument rankings. A processor determines portfolio weights for financial instruments based on a ranking associated with each instrument, a cutoff rank, and a risk multiplier.

14 Claims, 6 Drawing Sheets

U.S. PATENT DOCUMENTS

2009/0271332 A1* 10/2009 Lo et al. .................. 705/36 R
2009/0327156 A1* 12/2009 Dunne ..................... 705/36 R
2009/0327157 A1* 12/2009 Dunne ..................... 705/36 R
2010/0153307 A1*  6/2010 Stubbs et al. ............ 705/36 R
2010/0287116 A1* 11/2010 Arnott et al. ............ 705/36 R
2010/0325062 A1* 12/2010 O'Shaughnessy et al. . 705/36 R
2012/0089503 A1*  4/2012 Mittal et al. ............. 705/37

* cited by examiner

| Stock | Rank |
|---|---|
| A | 5 |
| B | 4 |
| C | 3 |
| D | 2 |
| E | 1 |

FIG. 4A

| Stock | Rank |
|---|---|
| A | 2 |
| B | 2 |
| C | 2 |
| D | 1 |
| E | 1 |

FIG. 4B

| Stock | Rank |
|---|---|
| A | 5 |
| B | 5 |
| C | 5 |
| D | 5 |
| E | 5 |
| F | 4 |
| G | 3 |
| H | 2 |
| I | 1 |

FIG. 4C

| Stock | Rank |
|---|---|
| A | 16 |
| B | 13 |
| C | 11 |
| D | 9 |
| E | 8 |
| F | 7 |
| G | 6 |
| H | 4 |
| I | 1 |

FIG. 4D

| Stock | P/E Ratio | Rank |
|---|---|---|
| A | 12.2 | 12.2 |
| B | 8.4 | 8.4 |
| C | 6 | 6 |
| D | 6 | 6 |
| E | 4.2 | 4.2 |

| | 502 | 504 | 506 | 508 | 510 | 512 |
|---|---|---|---|---|---|---|
| PorID | | 002 | 002 | 002 | 002 | 002 |
| $Rank_c$ | | 3 | 3 | 3 | 3 | 3 |
| LSRM | | 100 | 100 | 100 | 100 | 100 |
| Name | | A | B | C | D | E |
| Rank | | 1 | 2 | 3 | 4 | 5 |
| AdjRank | | -2 | -1 | 0 | 1 | 2 |
| RelWgt | | -0.67 | -0.33 | 0.00 | 0.33 | 0.67 |
| ActWgt | | -67 | -33 | 0 | 33 | 67 |
| BmkWgt | | 20 | 20 | 20 | 20 | 20 |
| PorWgt (L/S) | | -47 | -13 | 20 | 53 | 87 |
| AdjWgt (S) | | 47 | 13 | 0 | 0 | 0 |
| LOAM | | 0.6 | 0.6 | 0.6 | 0.6 | 0.6 |
| AdjWgt (L) | | 0 | 0 | 0 | -20 | -40 |
| PorWgt (L) | | 0 | 0 | 20 | 33 | 47 |

FIG. 5

METHODS AND SYSTEMS FOR BUILDING AND MANAGING PORTFOLIOS BASED ON ORDINAL RANKS OF SECURITIES

CROSS-REFERENCE TO RELATED APPLICATION

This application claims the benefit of U.S. Provisional Patent Application No. 61/095,851, entitled "Methods and Systems For Building And Managing Portfolios Based On Ordinal Ranks Of Securities" filed on Sep. 10, 2008, the entire disclosure of which is hereby incorporated by reference as if set forth herein in its entirety.

BACKGROUND

A conventional investment process identifies some investment criteria, such as price-to-earnings ratio (P/E) for stocks or yield to maturity (YTM) for bonds, to score or rank securities in order to identify attractive and unattractive investments. Market participants then use various types of techniques and/or formulae to convert these scores or ranks into actual security weights for the purpose of constructing an investment portfolio.

SUMMARY OF THE INVENTION

The invention discloses systems and methods for constructing and maintaining a portfolio, including an index, of financial instruments. Financial instruments may include securities, individual stocks, options, mutual funds, bonds, currency, or any other cash or derivative instruments. In one embodiment, said portfolio comprises a plurality of securities from a securities benchmark or universe. The term "universe" refers to any collection of securities. A "securities benchmark" refers to a securities index or other predefined collection of stocks used for performance comparison. In certain embodiments, said plurality of securities are ranked in an ordinal fashion. In certain embodiments, said portfolio comprises a plurality of securities from an ordinally ranked securities benchmark or universe, wherein a weight of an individual security within said portfolio varies in relation to its ordinal rank. In certain embodiments, said portfolio comprises a long-short portfolio, i.e., a portfolio including a plurality of securities held long and short. One way a security can be held short is to borrow shares of the security to sell now with the expectation that the shares can be repurchased at a later date, when its price is potentially lower. In certain embodiments, said portfolio consists of a plurality of securities held long.

In one aspect, the invention relates to a method for managing a portfolio using financial instrument rankings. The method includes determining, with a processor, portfolio weights for financial instruments in a plurality of financial instruments for an investment portfolio.

In one embodiment, portfolio weights are based on a ranking associated with each financial instrument, a cutoff rank associated with the plurality of financial instruments, and a risk multiplier associated with the plurality of financial instruments. In one embodiment, a portfolio weight is based on a first portfolio weight, which in turn is based on an active weight for each financial instrument. The active weight is determined based on the risk multiplier and a relative weight, which in turn is determined based on the financial instrument ranking and the cutoff rank. Optionally, portfolios weights are also based on a benchmark weight associated with each financial instrument.

In one embodiment, the portfolio includes financial instruments held short and long. Alternatively, the portfolio includes financial instruments held long. In these embodiments, a second portfolio weight for each financial instrument is calculated by the processor. The second portfolio weight is based on the first portfolio weight and a long adjusted weight for a particular financial instrument. The long adjusted weight is based on the active weight of the instrument and a long-only multiplier, which is based on at least one of the financial instruments in the plurality of financial instruments.

In one embodiment, rankings are calculated and assigned to a financial instrument by the processor. Optionally, the rankings are calculated by the processor based on at least one characteristic associated with the financial instrument, or based on the value of the at least one characteristic. In one embodiment, the ranking is calculated by the processor based on a relationship between one or more characteristics of the financial instrument and one or more characteristics associated with another financial instrument. Optionally, the processor may calculate rankings for different financial instruments differently.

In one embodiment, the ranking is an integer and is assigned by the processor to financial instruments according to an ordinal sequence. Optionally, the processor assigns the same ranking to two or more financial instruments. In another embodiment, the processor assigns nonconsecutive rankings to two financial instruments that are adjacent in rank. In one embodiment, at least one ranking is a noninteger and the cutoff rank is not the lowest rank associated with a financial instrument in the plurality of financial instruments.

In one embodiment, financial instruments with rankings higher than the cutoff rank have positive portfolio weights and instruments with rankings lower than the cutoff rank have negative portfolio weights. In this embodiment, the processor may purchase long positions for instruments with positive portfolio weights and short positions for instruments with negative weights.

In another aspect, the invention relates to a system for managing a portfolio using financial instrument rankings. The system includes a database and a processor configured to determine portfolio weights for financial instruments in a plurality of financial instruments for an investment portfolio, as described above.

In yet another aspect, the invention relates to a computer readable medium storing computer executable instructions, which, when executed on a processor, cause the processor to carry out a method for managing a portfolio using financial instrument rankings, as described above.

BRIEF DESCRIPTION OF DRAWINGS

The methods and systems may be better understood from the following illustrative description with reference to the following drawings in which:

FIGS. 4A-E depict different ranking schemes, according to illustrative embodiments of the invention;

FIG. 5 depicts an illustrative example of a database table for storing security and portfolio information, according to an illustrative embodiment of the invention.

DETAILED DESCRIPTION OF THE INVENTION

To provide an overall understanding of the invention, certain illustrative embodiments will now be described, including systems and methods for constructing and maintaining security portfolios by converting rankings into security weights. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
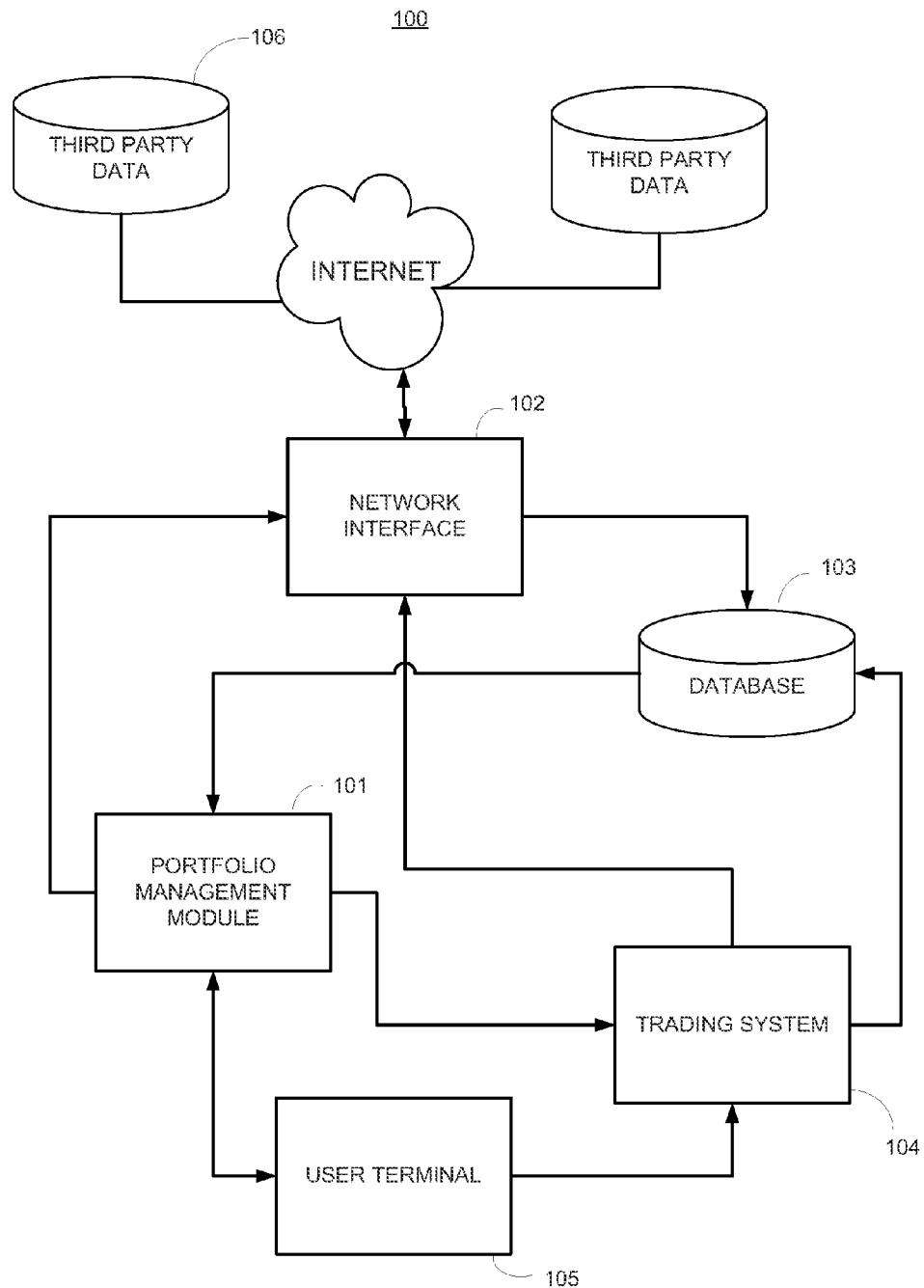
FIG. 1 is a schematic diagram of a system for constructing a securities portfolio.

FIG. 1 depicts a system 100 for the construction and maintenance of a portfolio comprising a plurality of securities according to an illustrative embodiment of the invention. The system 100 includes a portfolio management module 101, a network interface 102, a database 103, a trading system 104, and a user terminal 105. The portfolio management module 101 may obtain data about ranked security benchmarks and/or securities universes via the network interface 102. Alternatively, the portfolio management module 101 calculates the ranks based on data about the individual securities received over the network interface 102. The portfolio management module 101 builds one or more portfolios of securities, with the weight of each security in the portfolio(s) derived from its respective rank in the corresponding securities benchmark or universe, using for example, the methods described below. The database 103 stores the data collected and generated by the portfolio management module 101. The portfolio management module may also identify investments to buy and/or to sell (referred to as "trades") to build and maintain the one or more portfolios based on data collected via the network interface 102. The trading system 104 executes the trades identified by the portfolio management module 101. The user terminal 105, in one implementation, displays the identified trades and prompts a user for approval of the trades, prior to their communication to and execution by the trading system 104. The user terminal 105 also enables a user to provide additional instructions to the portfolio management module 101, including identifying a securities benchmark, a performance goal, and a desired tracking error. In some embodiments, the user may interact with the user terminal through a user interface, which is described in more detail in FIG. 6, below. The function of each of the above components is described further below in relation to FIGS. 2 and 3.

The portfolio management module 101, the database 103, the trading system 104, and the user terminal 105 preferably include software for execution on general or special purpose computers. More specifically, the components preferably include computer readable instructions, stored on a computer readable media, such as a magnetic, optical, magneto-optical, holographic, integrated circuit, or other form of non-volatile memory. The instructions may be coded, for example, using C, C++, JAVA, SAS, or other programming or scripting language. To be executed, the respective computer readable instructions are loaded into Random Access Memory associated with a processor. Upon execution by the processor, portfolio management module 101, the database 103, the trading system 104, and the user terminal 105 carry out the respective functions described below. The portfolio management module 101, the database 103, the trading system 104, and the user terminal 105 may execute on the same or different processors, without departing from the scope of the invention. For example, the database 103 may operate on a separate database server. The trading system 104, in one implementation, instead of executing locally, is a system operated by a third party to which trade instructions are directed over a private or public communications network. In general, the modules may be connected to one another logically in memory, or via a local or wide area network.

The network interface 102 is a hardware device with associated software and/or firmware to control communications over a network. In the system 100, it is assumed that the portfolio management module 101, the network interface 102, the database 103, the trading system 104, and the user terminal 105 are all located on a single computing device, thereby requiring only a single network interface 102 to a network, such as the Internet. In implementations in which the various components operate on separate hardware platforms, each hardware platform includes its own network interface to enable communications among the platforms. Using the network interface 102, the database 103, at the direction of the portfolio management module 101, can obtain data about companies and investments from third party data sources 106.

The user terminal 105, in addition to the software mentioned above, includes user interface equipment, including, for example, a keyboard, mouse, and monitor for displaying information to a user and for allowing the user to provide instructions to the trading system 104 and the portfolio management module 101. The user terminal 105 may also include a printer for providing hard copy output.

Figure 2:
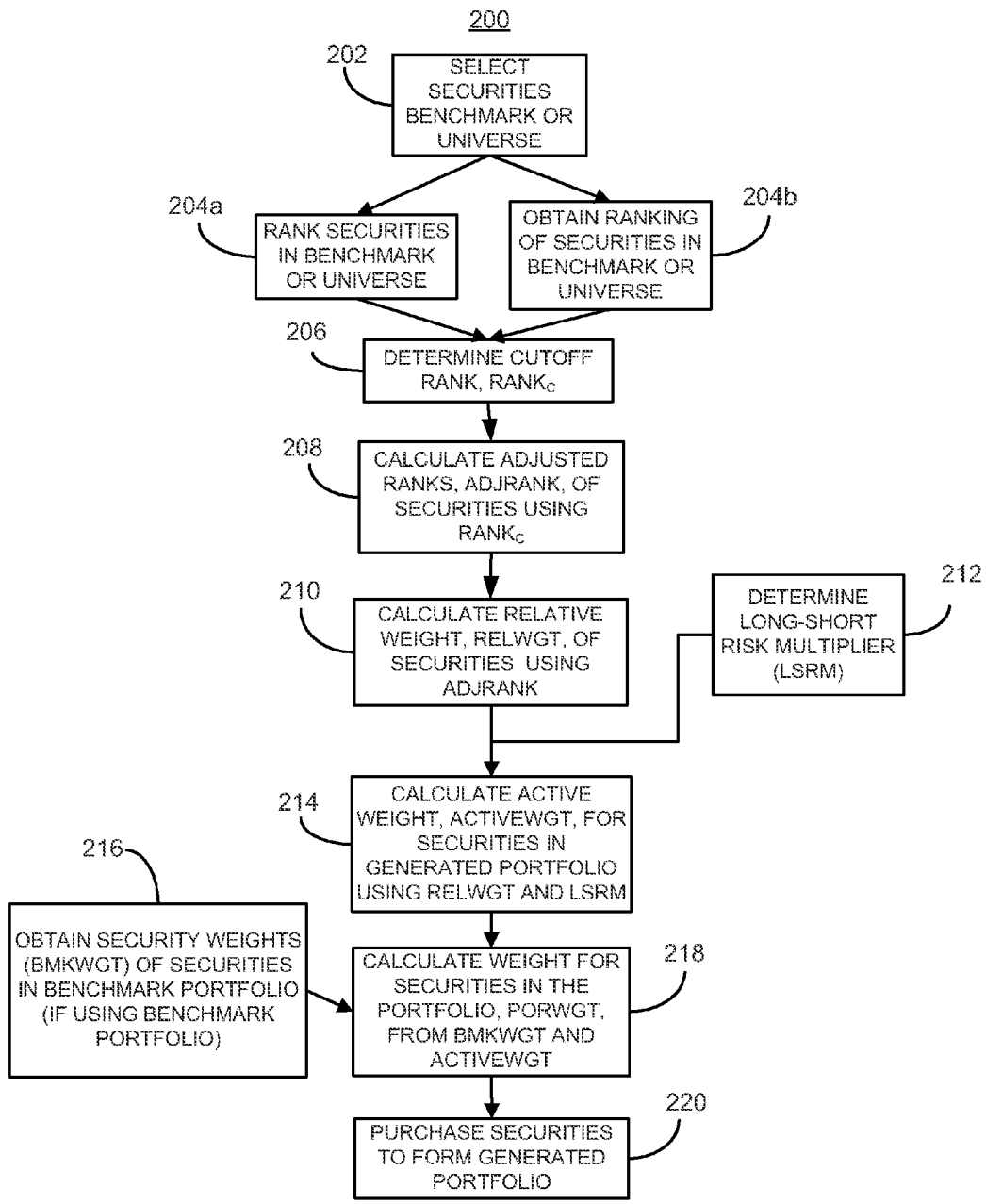
FIG. 2 is a flowchart depicting the process of deriving active security weights for a long-short portfolio from ordinal security ranks according to an illustrative embodiment of the invention.

FIG. 2 depicts a flowchart of a method 200 for creating long-short investment portfolios from security ranks, according to an illustrative embodiment of the invention. In step 202, a benchmark or universe is selected. Lists of potential benchmarks and universes may be obtained via the network interface, 102, or via user input, 105. Rankings for the securities in the benchmark or universe are then either generated (step 204a) or obtained from one or more sources (step 204b). Rankings may either be obtained via the network interface 102, via the user terminal 105, or generated locally, for example via the portfolio management module 101.

In some embodiments, the ranking may be ordinal, with a rank of 1 being the lowest and least attractive and a rank of N being the highest and most attractive, where N is the total number of securities in the universe or benchmark. For example, in the case of a stock universe defined by the Russell 1000 Index, the ranks would range from 1000 (highest and most attractive) to 1 (lowest and least attractive). In other embodiments, other forms of ranking, which are discussed in relation to FIGS. 4A-E below, may be used.

At step 206, a cutoff rank ($Rank_c$) is determined. The cutoff rank may be used to separate attractive and unattractive investments in the universe. In one embodiment, all securities with ranks higher than or equal to the cutoff rank are attractive, and all securities with ranks lower than the cutoff rank are unattractive. For example, if the cutoff rank in the case of the Russell 1000 universe is 500, securities having a rank greater than or equal to 500 are deemed attractive, and securities having a rank less than 500 are deemed unattractive. In certain embodiments, the cutoff rank may be generated by the user, via the user terminal 105, or retrieved from the database 103. In certain embodiments, the cutoff rank may be obtained via the network interface 102. In another embodiment, the cutoff rank is determined by simulating the results of using various cutoff ranks and other factors based on historic data, such as a risk multiplier, discussed in more detail below, to determine the appropriate combination of factors to achieve a desired tracking error to a performance benchmark.

At step 208, "adjusted" ranks for securities may be calculated relative to the cutoff rank Rank, by, for example, the portfolio management module 101. For a security i with rank $Rank_i$, an adjusted rank $AdjRank_i$ is calculated from the cutoff rank $Rank_c$ by the following formula:

$$AdjRank_i = Rank_i - Rank_c$$

For example, if a security has a rank of 8, and the cutoff rank is 5, then its adjusted rank would be 3. If a security has a rank of 3, and the cutoff rank is 5, then its adjusted rank would be −2.

In step 210, relative weights for securities may be calculated by, for example, the portfolio management module 101. A relative weight $RelWgt_i$ for security i is proportional to the security's adjusted rank $AdjRank_i$, and is calculated by the following formula:

$$RelWgt_i = AdjRank_i \Big/ \sum_{i >= c} (AdjRank_i), \text{ for all } i >= c$$

$$AdjRank_i \Big/ \sum_{i < c} |(AdjRank_i)|, \text{ for all } i > c$$

In step 212, a Long-Short Risk Multiplier ("LSRM") is determined, which is used to convert security relative weights into actual portfolio active weights. The magnitude of the LSRM controls the leverage and hence the risk of the portfolio. In step 214, the active weights for the securities are determined, based on the security relative weights and the LSRM. For example, the active weight $ActiveWgt_i$ of security i may be calculated by the following equation:

$$ActiveWgt_i = LSRM * RelWgt_i$$

In some embodiments, these determinations and selections are performed by the portfolio management module 101.

In some embodiments, the securities in the portfolio may be selected from a benchmark portfolio. In these embodiments, benchmark security weights are obtained from the benchmark portfolio in step 216. Actual portfolio weights for securities in the portfolio are then calculated in step 218 based on the benchmark security weights. For example, the portfolio weight $PorWgt_i$ of security i, with a benchmark weight of $BmkWgt_i$ and an active weight of $ActiveWgt_i$, may be calculated by the following equation:

$$PorWgt_i = BmkWgt_i + ActiveWgt_i$$

In other embodiments, the security benchmark weight is optional, and the benchmark weight $BmkWgt_i$ is set to zero, such as for a market neutral portfolio.

In certain embodiments, calculations and determinations of the weights and adjusted ranks mentioned above may be performed by the portfolio management module 101. In certain embodiments, securities are then purchased and sold (step 220) to form the generated portfolio. The process may be repeated periodically, e.g., on a monthly basis, to adjust the portfolio.

EXAMPLE 1

Long-Short Portfolios

Suppose a universe contains five securities: A, B, C, D, and E. Securities in this universe are ranked alphabetically, e.g., A=lowest rank (1), E=highest rank (5).

The following cases show a long-short market neutral application and long-short active extension applications of the method outlined above in relation to FIG. 2.

EXAMPLE 1A

In this example, shown in Table 1, the cutoff rank is specified to be the rank of security C, that is, a rank of 3. The risk multiplier is specified as 100, which represents the total short position in the portfolio. It also represents a leverage of 2 times, or 2:1, in a market neutral context. A risk multiplier of 50 would represent no leverage, and 200 would represent a leverage of 4 times, or 4:1. The benchmark is assumed to be the 1-month LIBOR rate.

$Rank_c = 3$
Long-Short Risk Multiplier=100
Benchmark=1-month LIBOR

TABLE 1

Example 1A portfolio weight calculation.

| Security | A | B | C | D | E |
|---|---|---|---|---|---|
| Rank | 1 | 2 | 3 | 4 | 5 |
| AdjRank | −2 | −1 | 0 | 1 | 2 |
| RelWgt | −0.67 | −0.33 | 0.00 | 0.33 | 0.67 |
| ActiveWgt | −67 | −33 | 0 | 33 | 67 |
| BmkWgt | 0 | 0 | 0 | 0 | 0 |
| PorWgt (Long/Short) | −67 | −33 | 0 | 33 | 67 |

In this example, the ranks of the securities are converted into actual portfolio weights of −67%, −33%, 0, 33%, and 67% for securities A, B, C, D, and E, respectively. The total short positions are equal to the total long positions, which corresponds to a market neutral strategy.

EXAMPLE 1B

Example 1B, shown in Table 2, differs from Example 1A only in the specification of the benchmark. In this example, the benchmark is assumed to be an equal-weighted portfolio of the five securities.

$Rank_c = 3$
Long-Short Risk Multiplier=100
Benchmark=equal-weighted composition of securities A, B, C, D, and E

TABLE 2

Example 1B portfolio weight calculation.

| Security | A | B | C | D | E |
|---|---|---|---|---|---|
| Rank | 1 | 2 | 3 | 4 | 5 |
| AdjRank | −2 | −1 | 0 | 1 | 2 |
| RelWgt | −0.67 | −0.33 | 0.00 | 0.33 | 0.67 |
| ActiveWgt | −67 | −33 | 0 | 33 | 67 |
| BmkWgt | 20 | 20 | 20 | 20 | 20 |
| PorWgt (Long/Short) | −47 | −13 | 20 | 53 | 87 |

In this example, the total short positions are −60%, and the total long positions are +160%, which represents a 160/60 active extension strategy.

EXAMPLE 1C

Example 1C, shown in Table 3, illustrates that this method can be applied to achieve various levels of active extension by varying the risk multiplier. In this example, a 130/30 active extension portfolio is constructed, in which a portfolio holds 130% long positions and 30% short positions, by reducing the risk multiplier to 70.

$Rank_c=3$

Long-Short Risk Multiplier=70

Benchmark=equal-weighted composition of securities A, B, C, D, and E

TABLE 3

Example 1C portfolio weight calculation.

|  | A | B | C | D | E |
|---|---|---|---|---|---|
| Rank | 1 | 2 | 3 | 4 | 5 |
| AdjRank | −2 | −1 | 0 | 1 | 2 |
| RelWgt | −0.67 | −0.33 | 0.00 | 0.33 | 0.67 |
| ActiveWgt | −46.9 | −23.1 | 0 | 23.1 | 46.9 |
| BmkWgt | 20 | 20 | 20 | 20 | 20 |
| PorWgt (Long/Short) | −26.9 | −3.1 | 20 | 43.1 | 66.9 |

In this example, the total short positions are equal to −30%, and the total long positions are equal to +130%.

Figure 3:
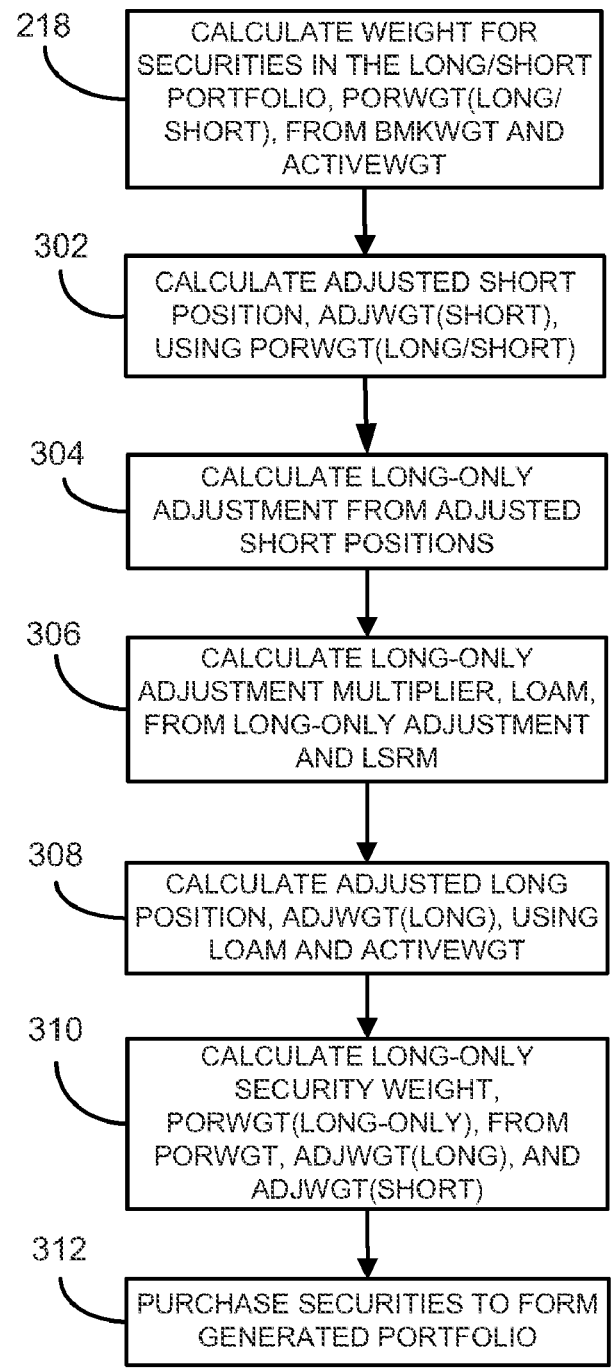
FIG. 3 is a flowchart depicting the process of deriving active security weights for a long-only portfolio from active security weights for a long-short portfolio according to an illustrative embodiment of the invention.

FIG. 3 depicts a process 300 for deriving active security weights for a long-only portfolio from active security weights for a long-short portfolio, according to an illustrative embodiment of the invention. In certain embodiments, a portfolio may only be able to hold long positions (i.e., no shorting is allowed). In these embodiments, the long-short portfolio weights, as calculated in step 218 in FIG. 2, can be adjusted to reflect this constraint. For example, in contrast to example 1B, securities A and B cannot be shorted in a long-only portfolio. These securities can be held only at a zero weight, which means a maximum under-weight equal to their weight in the benchmark. In this example, therefore, the maximum achievable total under-weight position is 40%:20% for security A and 20% for security B. Because the total over-weight position in a portfolio must equal the total under-weight position, the long positions need to be adjusted to bring the total over-weight from 100% down to 40%.

Process 300 begins with step 218, identical to step 218 of process 200, discussed above and shown in FIG. 2. In step 302, an adjusted weight $AdjWgt_i(Short)$ is first calculated for each security i in the portfolio that has a negative portfolio weight $PorWgt_i$ (i.e., is shorted) with the following formula:

$$AdjWgt_i(Short) = -1 * PorWgt_i(Long/Short), \text{ for all } PorWgt_i < 0$$

In step 304, a long-only adjustment is calculated, based on the adjusted weights determined in step 302, according to the following formula:

$$\text{Long-Only Adjustment} = \Sigma AdjWgt_i(Short), \text{ for all } PorWgt_i < 0$$

In step 306, a Long-Only Adjustment Multiplier ("LOAM") is calculated. The LOAM scales the long positions in the portfolio such that the long-only adjustment, calculated in the previous step, is distributed proportionally among the long positions. The LOAM is calculated according to the following formula:

$$\text{Long-Only Adjustment Multiplier (LOAM)} = \text{Long-Only Adjustment/LSRM}$$

Once the LOAM has been calculated in step 306, in step 308 a new adjusted weight $AdjWgt_i(Long)$ is calculated for each security i in the portfolio that has a positive portfolio weight $PorWgt_i$ with the following formula:

$$AdjWgt_i(Long) = -1 * (ActiveWgt_i * LOAM), \text{ for } i >= c$$

In step 310, a new portfolio weight is calculated for each security i in the portfolio, regardless of whether its previous portfolio weight was positive or negative. This new portfolio weight $PorWgt_i(Long\text{-}Only)$ is calculated as follows:

$$PorWgt_i(Long\text{-}Only) = PorWgt_i(Long/Short) + AdjWgt_i(Long) + AdjWgt_i(Short)$$

In certain embodiments, the calculation of the long-only adjustment, LOAM, $AdjWgt_i(Short)$, and/or $AdjWgt_i(Long)$ is done by the portfolio management module 101. In certain embodiments, the securities are then purchased and sold in step 312 to form the generated portfolio.

EXAMPLE 2

Long-Only Portfolio

Example 2, shown in Table 4, illustrates the construction of a long-only portfolio, using the following assumptions:

$Rank_c=3$

Long-Short Risk Multiplier=100

Benchmark=equal-weighted composition of securities A, B, C, D, and E

TABLE 4

Example 2 portfolio weight calculation.

|  | A | B | C | D | E |
|---|---|---|---|---|---|
| Rank | 1 | 2 | 3 | 4 | 5 |
| AdjRank | −2 | −1 | 0 | 1 | 2 |
| RelWgt | −0.67 | −0.33 | 0.00 | 0.33 | 0.67 |
| ActiveWgt | −67 | −33 | 0 | 33 | 67 |
| BmkWgt | 20 | 20 | 20 | 20 | 20 |
| PorWgt (Long/Short) | −47 | −13 | 20 | 53 | 87 |
| Long-Only Constraint Adjustment | | | | | |
| AdjWgt (Short) | 47 | 13 | | | |
| AdjWgt (Long) | | | 0 | −20 | −40 |
| PorWgt (Long-Only) | 0 | 0 | 20 | 33 | 47 |

(Long-Only Adj = 47 + 13 = 60)

In this example, the Long-Only Adjustment Multiplier equals 0.60 (60/100). After this adjustment, the total under-weight positions (40%) equal the total over-weight positions (40%), and the long-only portfolio holds no short positions.

The illustrative methods described above in relation to FIGS. 2 and 3 allow construction of an infinite number of portfolios by varying the $Rank_c$ and Long-Short Risk Multiplier parameters. Varying the parameters produces portfolios with varying risk characteristics. The $Rank_c$ parameter varies the number of securities that are over- or under-weight (and hence the concentration of positions), while the Long-Short Risk Multiplier varies the magnitude of the over- and under-weights. The concentration and magnitude of positions combine to produce portfolios with different levels of absolute and relative risk. These methods may also be applied, as specified above, in the case of multiple cutoff ranks to designate attractive and unattractive securities. For example, in the case of the Russell 1000 universe, securities with a rank of 750 and above may be specified as attractive, securities with a rank of 250 and below as unattractive, and securities with a rank between 250 and 750 as neutral. For neutral securities, the portfolio weight is set to the benchmark weight.

For example, review Example 1A above. With a Rank, parameter of 3 and Long-Short Risk Multiplier of 100, the portfolio holds a total 100% long and 100% short position. The portfolio is said to have a leverage of 2:1. Keeping the Rank, parameter of 3 and increasing the Long-Short Risk Multiplier to 200 results in a total 200% long and 200% short position. The leverage on the portfolio increases to 4:1, and as a result, the total absolute risk of the portfolio doubles. If the $Rank_c$ parameter is now changed from 3 to 4, the leverage of the portfolio remains at 4:1, but the number of names held long drops from 2 to 1. Increasing the $Rank_c$ parameter increases the diversity of positions on the short side and decreases the diversity of positions on the long side. Therefore, changing the parameter has changed the risk profile of the portfolio.

Determining the appropriate Rank, and Long-Short Risk Multiplier parameters to achieve a targeted risk level may be accomplished through empirical testing. For example, suppose a long-only portfolio with 1.5% tracking error to the S&P 500 benchmark is to be constructed. Using historical security ranking data, portfolios with various combinations of Rank, and Long-Short Risk Multiplier can be constructed and examined to determine the relative risk characteristics over a long time period, say 15 years. Each combination will produce a portfolio with a specific level of risk (and return). The combination of Rank, and Long-Short Risk Multiplier that produces a portfolio most closely matching the targeted tracking error of 1.5% will then be chosen.

The methods outlined above may be used to create investment portfolios derived from security ranks, which are based on a single investment attribute or a combination of investment attributes. The methods may be applied across asset classes or within an asset class. In some embodiments, security ranks may be ordinal or based on some other ranking scheme. FIGS. 4A-E depict examples of different ranking schemes according to illustrative embodiments of the invention. In FIG. 4A, an illustrative ordinal ranking scheme is shown, in which each security is assigned a different rank, and securities adjacent to each other in rank are assigned adjacent integers. FIG. 4B depicts an alternative, grouped ranking scheme, in which multiple securities may be grouped together and assigned the same rank. For example, in FIG. 4B, stocks A, B, and C are in a first group, assigned a rank of 2, and stocks D and E are in a second group, assigned a rank of 1. In some embodiments, the ranks assigned to groups adjacent in rank are not consecutive. For example, the first group may be assigned rank 5 and the second group may be assigned rank 3. FIG. 4C depicts another alternative ranking scheme, in which the ranking methodology varies with the rank. A first portion of the stocks or securities may be ranked in a particular manner, and other portions may be ranked in one or more different manners. For example, in FIG. 4C, the stocks A-E are grouped together and assigned the same rank, and stocks F-I are ranked in an ordinal fashion. The different portions may be delineated by, for example, number of securities, rank, cutoff rank, or any other parameter associated with the security. While the example in FIG. 4C depicts a grouped ranking for the first portion and an ordinal ranking for the second group, any type of ranking may be used for the first and second portions. FIG. 4D depicts yet another alternative ranking scheme, in which securities that are adjacent or closest in rank can be assigned ranks that are nonconsecutive. For example, in FIG. 4D, stock A is closest in rank to stock B, but stocks A and B are assigned nonconsecutive rankings (16 versus 13). The nonconsecutive ranking scheme may be based on one or more distribution functions. For example, a particular set of securities may be ranked in a normal or gaussian fashion, with rankings at the extremes of the distribution spaced farther apart than rankings near the center of the distribution function(s). In FIG. 4E, another alternative ranking scheme is depicted, in which securities may have noninteger rankings. The noninteger rankings may be based on one or more parameters associated with the security. In the example shown in FIG. 4E, the ranking of a stock is based on its price-to-earnings ratio (P/E). Alternatively, the ranking of a security may be related to any other signal associated with or representative of the security. Any of the ranking schemes described above may be used alone or in combination with one or more other ranking schemes.

The finance literature has documented the existence of the Value Premium, according to which companies with low valuation ratios, such as price-to-book value and price-to-earnings, outperform companies with high valuation ratios. Value-biased portfolios of varying risk levels may be created using the methods described above in the following manner:

Rank securities within a given universe based on a combination of price-to-book, price-to-sales, and free cash flow-to-price ratios.

Use the method described in FIG. 2 to create a market neutral portfolio.

Use the methods described in FIGS. 2 and 3 to create two long-only portfolios, for example, one with a targeted tracking error of approximately 1.5% and the other with a targeted tracking error of approximately 3.5%.

These methods are advantageous at least because the direct use of ordinal security ranks to derive active weights leads to a pure capture of one or more investment attributes in the portfolio. As a result, and as shown below in Tables 5 and 6, the risk and return profile of the portfolios generated using these methods is more efficient (that is, higher returns for lower risk) compared to the existing value indices and other publicly available value-biased strategies. For example, in Table 5, the after-cost excess return and excess risk for an S&P 500 portfolio based on an existing value growth method is 1.12% and 9.22%, respectively. In contrast, a simulated S&P 500 portfolio based on the market neutral approach detailed above has a higher excess return (2.00% versus 1.12%) and a lower excess risk (4.47% versus 9.22%). The simulated S&P portfolios depicted in Tables 5 and 6 are based on historical data, and past performance is not indicative of future performance.

TABLE 5

Simulated performance of market neutral approaches (Jan. 1, 1992-Jun. 30, 2008).

| | Excess Return (%) | | Excess Risk (%) | Sharpe Ratio | | Turnover (%) |
|---|---|---|---|---|---|---|
| | Before Cost | After Cost | | Before Cost | After Cost | |
| S&P 500 (USD) | | | | | | |
| S&P 500 Value-Growth | 1.54 | 1.12 | 9.22 | 0.17 | 0.12 | 35 |
| Market Neutral Approach | 3.11 | 2.00 | 4.47 | 0.70 | 0.45 | 90 |

TABLE 5-continued

Simulated performance of market neutral approaches (Jan. 1, 1992-Jun. 30, 2008).

| | Excess Return (%) | | Excess Risk | Sharpe Ratio | | Turnover |
|---|---|---|---|---|---|---|
| | Before Cost | After Cost | (%) | Before Cost | After Cost | (%) |
| Russell 1000 (USD) | | | | | | |
| Russell 1000 Value-Growth | 3.42 | 2.97 | 11.44 | 0.30 | 0.26 | 28 |
| Market Neutral Approach | 4.10 | 2.67 | 6.85 | 0.60 | 0.39 | 84 |
| Russell 2000 (USD) | | | | | | |
| Russell 2000 Value-Growth | 6.05 | 4.01 | 14.05 | 0.43 | 0.29 | 68 |
| Market Neutral Approach | 10.90 | 7.04 | 6.78 | 1.61 | 1.04 | 115 |
| MSCI Europe (USD) | | | | | | |
| MSCI Europe Value-Growth | 3.06 | 2.09 | 7.39 | 0.41 | 0.28 | 54 |
| Market Neutral Approach | 5.34 | 3.64 | 5.76 | 0.93 | 0.63 | 88 |
| MSCI Japan (JPY) | | | | | | |
| MSCI Japan Value-Growth | 5.61 | 4.17 | 10.93 | 0.51 | 0.38 | 60 |
| Market Neutral Approach | 6.49 | 4.34 | 9.87 | 0.66 | 0.44 | 85 |

TABLE 6

Simulated performance of long-only approaches (Jan. 1, 1992-Jun. 30, 2008).

| | Active Return (%) | | Active Risk | Information Ratio | | Turnover |
|---|---|---|---|---|---|---|
| | Before Cost | After Cost | (%) | Before Cost | After Cost | (%) |
| S&P 500 (USD) | | | | | | |
| Value Benchmark | 0.82 | 0.68 | 4.74 | 0.17 | 0.14 | 18 |
| Long-Only Low TE Approach | 1.06 | 0.88 | 1.32 | 0.80 | 0.67 | 21 |
| Long-Only High TE Approach | 2.45 | 2.15 | 3.09 | 0.79 | 0.70 | 34 |
| Russell 1000 (USD) | | | | | | |
| Value Benchmark | 1.44 | 1.27 | 5.92 | 0.24 | 0.21 | 14 |
| Long-Only Low TE Approach | 1.37 | 1.04 | 1.43 | 0.96 | 0.73 | 25 |
| Long-Only High TE Approach | 2.99 | 2.52 | 3.04 | 0.98 | 0.83 | 35 |
| Russell 2000 (USD) | | | | | | |
| Value Benchmark | 2.70 | 2.02 | 7.42 | 0.36 | 0.27 | 34 |
| Long-Only Low TE Approach | 3.98 | 2.97 | 2.64 | 1.51 | 1.13 | 45 |
| Long-Only High TE Approach | 6.80 | 5.45 | 5.40 | 1.26 | 1.01 | 59 |
| MSCI Europe (USD) | | | | | | |
| Value Benchmark | 1.47 | 1.15 | 3.71 | 0.40 | 0.31 | 27 |
| Long-Only Low TE Approach | 0.93 | 0.71 | 1.51 | 0.61 | 0.47 | 17 |
| Long-Only High TE Approach | 1.89 | 1.46 | 3.83 | 0.49 | 0.38 | 32 |
| MSCI Japan (JPY) | | | | | | |
| Value Benchmark | 2.72 | 2.24 | 5.39 | 0.50 | 0.42 | 30 |
| Long-Only Low TE Approach | 1.46 | 1.27 | 2.12 | 0.69 | 0.60 | 12 |
| Long-Only High TE Approach | 2.91 | 2.54 | 3.66 | 0.80 | 0.69 | 23 |

Another advantage of these methods is that they allow investors to create value-biased portfolios for different levels of targeted absolute and relative risk. For instance, investors can choose the levels of leverage, shorting, and tracking error by varying the Rank and Long-Short Risk Multiplier parameters via user terminal 105 to create value-biased portfolios that better suit their specific investment needs and portfolio structures.

FIG. 5 depicts an illustrative example of a database table 500 for storing security and portfolio information according to an illustrative embodiment of the invention. The database table 500 may be stored in, for example, the database 103 shown in FIG. 1. The database table 500 contains one or more columns that represent a particular security in a particular portfolio. Each security is then associated with a number of parameters, depicted in the database table 500 as rows, such as a portfolio identification (PorID), a security name (Name), a rank (Rank), and other parameters discussed in relation to FIGS. 2 and 3, above. The database table 500 and some or all of its entries may be received from a third party source, automatically generated by the system (for example by the portfolio management module 101), or created and/or populated by user entry via the user terminal 105. In some embodiments, user entry to create and/or populate the database table 500 may be performed via user interface 600, discussed below in relation to FIG. 6. Alternatively, securities may be represented in rows, with security parameters represented as columns.

Figure 6:
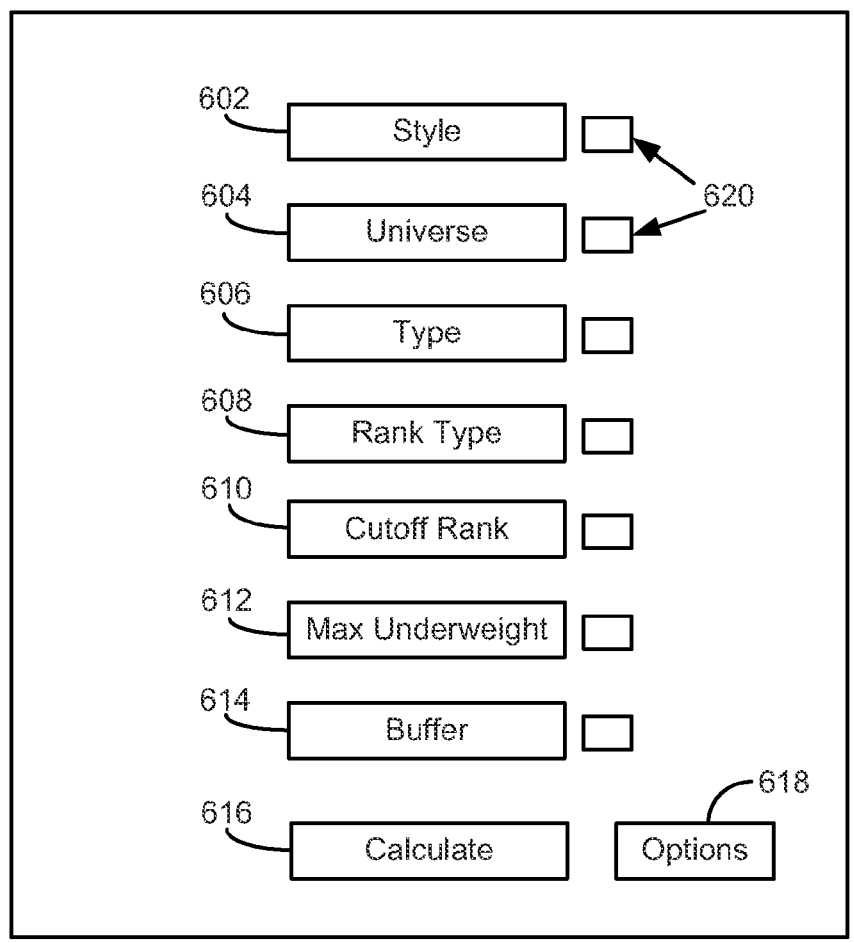
FIG. 6 depicts a user interface for the system of FIG. 1, according to an illustrative embodiment of the invention.

FIG. 6 depicts a user interface 600 for the system of FIG. 1, according to an illustrative embodiment of the invention. The user interface 600 may be displayed to the user on user terminal 105. The user interface 600 includes one or more selectable options for the user to adjust particular parameters. In the example depicted in FIG. 6, the user can adjust the investment style 602, e.g., U.S. Large Cap, Europe Large Cap; the particular security or stock universe or benchmark 604; the type of portfolio 606 desired, e.g., long-short or long-only; how the ranking 608 is to be performed; the cutoff rank 610; and the maximum security underweight 612. In some embodiments, the user may make selections for these options by a drop-down menu or by manually typing in values via the user terminal 105. The user may also be able to import files containing selections for these options by actuating file selector 620. For example, a user may be able to import a customized list of securities for the "universe" option. After selecting the appropriate options, the user may actuate the "calculate" option 616 to have the system or portfolio management module 101 generate the portfolio. The user may also be able to actuate an options selector 618 to select options pertaining to the user interface or the system. For example, the user may be able to add or remove parameter choices. In some embodiments, user interface 600 is implemented as instructions encoded on computer-readable media.

The invention may be embodied in other specific forms without departing from the spirit or essential characteristics thereof. The foregoing embodiments are therefore to be considered in all respects illustrative, rather than limiting of the invention.

What is claimed is:

1. A method of assigning portfolio weights to each financial instrument in a portfolio of financial instruments based on a ranking of the financial instruments, the method comprising:

assigning a long-short portfolio weight to each financial instrument in the portfolio to create a long-short portfolio by:

determining, with a processor, a cutoff rank and a long-short risk multiplier (LSRM) parameter for the portfolio, wherein the LSRM parameter is indicative of a magnitude of active positions in the long-short portfolio;

determining, with the processor, a ranking and a benchmark weight for each financial instrument in the portfolio; and assigning, with the processor, a long-short portfolio weight to each financial instrument in the portfolio, wherein the long-short portfolio weight assigned to the $i^{th}$ financial instrument is determined according to the relationship $$PorWgt_i = BmkWgt_i + (LSRM * RelWgt_i),$$

wherein $BmkWgt_i$ denotes the benchmark weight for the $i^{th}$ financial instrument and $RelWgt_i$ denotes a relative weight for the $i^{th}$ financial instrument determined according to the relationship $$RelWgt_i = (Rank_i - Rank_c)/\Sigma_{Ranki \geq Rankc}(Rank_i - Rank_c)$$

for all i with $Rank_i \geq Rank_c$
and $$RelWgt_i = (Rank_i - Rank_c)/\Sigma_{Ranki < Rankc}|(Rank_i - Rank_c)|,$$

for all i with $Rank_i < Rank_c$,
wherein $Rank_i$ denotes the ranking for the $i^{th}$ financial instrument and $Rank_c$ denotes the cutoff rank; and converting the long-short portfolio weight for a respective financial instrument in the long-short portfolio to a corresponding long-only portfolio weight by:

determining, with the processor, a long-only adjustment multiplier (LOAM) parameter based on the LSRM parameter and a sum of long-short portfolio weights corresponding to short-held financial instruments in the long-short portfolio;

assigning, with the processor, a long-only portfolio weight to the respective financial instrument based on a difference between the ranking of the respective financial instrument and the cutoff rank, the benchmark weight of the respective financial instrument, and the LOAM parameter, if the ranking of the respective financial instrument is larger than the cutoff rank; and assigning, with the processor, a long-only portfolio weight of substantially zero to the respective financial instrument if the respective financial instrument corresponds to a short-held financial instrument in the long-short portfolio.

2. The method of claim 1, wherein the cutoff rank is generated from historical financial data.

3. The method of claim 1, wherein the benchmark weight for a respective financial instrument in the portfolio is determined to correspond to a weight of the respective financial instrument in a financial index selected from the S&P 500, Russell 1000, Russell 2000, MSCI Europe, and MSCI Japan indices.

4. The method of claim 1, wherein the LOAM is determined according to the relationship $$LOAM = (-\Sigma PorWgt_i)/LSRM, \text{ for all } PorWgt_i < 0$$

wherein $PorWgt_i$ denotes the determined long-short portfolio weight for the $i^{th}$ financial instrument.

5. The method of claim 1, further comprising determining the cutoff rank based on one or more of a price-to-book, price-to-sales ratio, and a free cash flow-to-price ratio associated with the portfolio.

6. The method of claim 1, wherein the rank for each financial instrument in the portfolio is determined based on an ordinal ranking scheme.

7. The method of claim 1, wherein the rank for each financial instrument in the portfolio is determined according to a grouped ranking scheme in which at least two financial instruments in the portfolio are assigned a shared ranking.

8. A system for assigning portfolio weights to each financial instrument in a portfolio of financial instruments based on a ranking of the financial instruments, the system comprising:

a database; and
a processor configured to:

determine a cutoff rank and a long-short risk multiplier (LSRM) parameter for the portfolio, wherein the LSRM parameter is indicative of a magnitude of active positions in a long-short portfolio;

determine a ranking and a benchmark weight for each financial instrument in the portfolio, wherein the benchmark weight is retrieved from the database;

assign a long-short portfolio weight to each financial instrument in the portfolio, wherein the long-short portfolio weight assigned to the $i^{th}$ financial instrument is determined according to the relationship $$PorWgt_i = BmkWgt_i + (LSRM * RelWgt_i),$$

$BmkWgt_i$, denotes the benchmark weight for the $i^{th}$ financial instrument and $RelWgt_i$ denotes a relative weight for the $i^{th}$ financial instrument determined according to the relationship $$RelWgt_i = (RanK_i - Rank_c)/\Sigma_{Ranki \geq Rankc}(Rank_i - Rank_c),$$

for all i with $Rank_i \geq Rank_c$
and $$RelWgt_i = (Rank_i - Rank_c) / \Sigma_{Ranki < Rankc} |(Rank_i - Rank_c)|,$$

for all i with $Rank_i < Rank_c$,
wherein $Rank_i$ denotes the ranking for the $i^{th}$ financial instrument and $Rank_c$ denotes the cutoff rank;

determine a long-only adjustment multiplier (LOAM) parameter based on the LSRM parameter and a sum of long-short portfolio weights corresponding to short-held financial instruments in the long-short portfolio;

assign a long-only portfolio weight to the respective financial instrument based on a difference between the ranking of the respective financial instrument and the cutoff rank, the benchmark weight of the respective financial instrument, and the LOAM parameter, if the ranking of the respective financial instrument is larger than the cutoff rank; and assign a long-only portfolio weight of substantially zero to the respective financial instrument if the respective financial instrument corresponds to a short-held financial instrument in the long-short portfolio.

9. The system of claim 8, wherein the processor is further configured to determine the cutoff rank from historical financial data.

10. The system of claim 8, wherein the processor is further configured to determine the benchmark weight for a respective financial instrument in the portfolio to correspond to a weight of the respective financial instrument in a financial index selected from the S&P 500, Russell 1000, Russell 2000, MSCI Europe, and MSCI Japan indices.

11. The system of claim 8, wherein the processor is further configured to determine the LOAM according to the relationship $$LOAM = (-\Sigma PorWgt_j) / LSRM, \text{ for all } PorWgt_j < 0$$

wherein $PorWgt_j$ denotes the determined long-short portfolio weight for the $i^{th}$ financial instrument.

12. The system of claim 8, wherein the processor is further configured to determine the cutoff rank based on one or more of a price-to-book, price-to-sales ratio, and a free cash flow-to-price ratio associated with the portfolio.

13. The system of claim 8, wherein the processor is further configured to determine the rank for each financial instrument in the portfolio based on an ordinal ranking scheme.

14. The system of claim 8, wherein the processor is further configured to determine the rank for each financial instrument in the portfolio according to a grouped ranking scheme in which at least two financial instruments in the portfolio are assigned a shared ranking.

* * * * *